Oct. 14, 1958     A. C. ROWLEY     2,855,631
METHOD OF PREPARING WIRE INSULATED WITH A VINYL RESIN
Filed Feb. 10, 1955
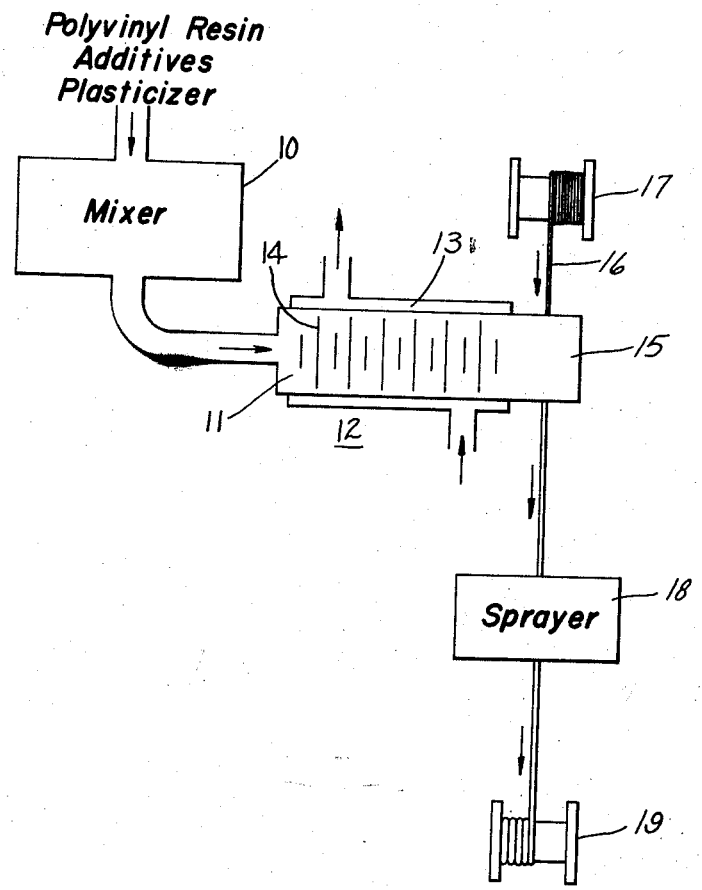
Inventor:
Arthur C. Rowley
by Allard A. Braddock
His Attorney

United States Patent Office 2,855,631
Patented Oct. 14, 1958

2,855,631

METHOD OF PREPARING WIRE INSULATED WITH A VINYL RESIN

Arthur C. Rowley, Stratford, Conn., assignor to General Electric Company, a corporation of New York Application February 10, 1955, Serial No. 487,467

3 Claims. (Cl. 18—59)

This invention relates to a wire insulated with a polyvinyl resin. More particularly, the invention relates to a method for extruding a polyvinyl resin onto a conductor to produce an insulated wire.

In the methods usually employed to extrude polyvinyl resins onto wire, the resin is mixed at a temperature of about 250° F.–300° F. with various softeners and plasticizers to produce the proper viscosity or consistency for extrusion and the proper flexibility in the finished product. The mixture is then run through an extrusion apparatus at or above the mixing temperature and extruded upon a conductor being drawn through the head of the extrusion apparatus. During passage through the extrusion apparatus, the temperature of the mixture may undergo a rise. After passage through the extruder, the vinyl insulated wire is quickly cooled to avoid hot flow of the vinyl insulation.

The viscosity of the feed stock in the extrusion process described above must be very carefully controlled in order to provide satisfactory operations. If the feed stock is too viscous, it becomes difficult to work with and the feed rate is decreased. If the feed stock is not sufficiently viscous, the thickness of the extruded insulation layer is difficult to control. It is usually desirable to cool and store the feed stock before it is introduced to the extrusion apparatus. If its mixing took place in a Banbury type mixer in which it was kneaded during mixing, the feed stock solidifies upon cooling. It is then desirable to cut the feed stock into rice-sized particles to facilitate handling. If the starting vinyl material was in the form of granulated particles and there was no kneading action during the mixing process, the feed stock remains in the granulated form upon cooling.

Whenever the feed stock is in the form of small solid particles prior to the operating step which heats the mixture to obtain the proper viscosity for extrusion, air inclusions are present in the final product. In addition to this objectionable feature, the conventional method of preparing feed stock subjects the stock to high temperature for a relatively long time and this results in discoloration of the final product.

It is an object of the present invention to provide a method for feeding a polyvinyl resin in a form in which air may readily be excluded.

Another object of the invention is to provide a method for extruding a polyvinyl resin upon a conductor whereby the resin is maintained at a high temperature for a minimum of time.

A further object of the invention is to produce a conductor having a layer of polyvinyl resin insulation of low porosity.

Other objects of the invention will be apparent from the following specification taken in conjunction with the annexed drawing which is a schematic flow diagram illustrating the operation of this invention. Referring to the drawing, a polyvinyl plastisol is prepared in a mixer 10. The plastisol may either be stored or introduced directly to the barrel 11 of an extruder 12. The barrel 11 has a jacket 13 for the introduction of a heating fluid to bring the temperature of the plastisol to the fusion level as the feed screw 14 of the extruder 12 advances it toward the head 15 of the extruder 12. Bare wire 16 is drawn from a reel 17 through the die (not shown) of the head 15 where it is coated with the plastisol now at fusion temperature. The coated wire 16 is then cooled by passage through a cold water spray 18 after which it is wound on a reel 19.

Occasionally, thermosetting components are added to the plastisol and in this event it may be necessary to add a curing oven (not shown) between the extruder head 15 and sprayer 18. Briefly stated, in accordance with one of its aspects, the invention is directed to the method of preparing insulated wire which comprises heating a vinyl plastisol mixture to fusion temperature within the barrel of the extruder, and extruding the fused plastisol mixture onto a conductor.

The term "plastisol" is well-known in the art and has reference to a fluid or pasty mixture for suspension of a resin in a plasticizer which is a poor solvent for the resin at ordinary temperatures, but which is capable of dissolving the resin particles at elevated temperatures, forming a gel structure. Thereafter, when cooled, the plastisol forms a rigid structure. In order to form a plastisol, the vinyl polymer must be finely divided—preferably of a size where all particles will pass through a 100-mesh screen and almost all will pass through a 200-mesh screen. Emulsion polymerized polyvinyl material normally produces particles of the optimum size.

In accordance with this invention, a vinyl extrusion mixture is prepared by heating a vinyl plastisol mixture to fusion temperature in the barrel of an extrusion apparatus. After the fusion temperature, which is normally about 400° F., has been attained, the extrusion mixture is passed through the extrusion head or die before the temperature is lowered.

By fusing the vinyl plastisol in the extrusion apparatus prior to its passage through the die, the exclusion of air and moisture from the feed stock allows higher extrusion rates without porosity. In addition, the time the vinyl material is subjected to temperatures of the order of 400° F. is shortened, thereby decreasing heat degradation and discoloration and allowing a reduction in the quantity of stabilizers and pigments used. Since the vinyl plastisols are prepared by mixing at room temperature, thermosetting materials such as epoxy resins and polyester resins may be used as compounding ingredients which are caused to polymerize either during passage through the extrusion apparatus or during subsequent storage, thereby providing a vinyl mixture having properties covering a broad range of service conditions and electrical requirements.

While polyvinyl chloride is a preferred vinyl material for use in accordance with this invention, other vinyl materials such as polyvinyl acetate and copolymers of vinyl chloride and vinyl acetate are also satisfactory. The working examples which follow provide typical formulations and proportions of vinyl plastisols useful in this invention. It is understood that the invention is applicable to vinyl plastisols generally and is not limited to the particular components and proportions given in the working examples.

*Example 1.*—The following materials were added to a mixing apparatus in the order named:

| | Parts by weight |
|---|---|
| Tricresyl phosphate | 137.5 |
| Acetylated castor oil | 27.5 |
| A paraffinic mineral oil having a boiling range around 400° C. | 5.5 |
| A mixture of tribasic lead sulphate and tribasic lead silicate | 16.5 |
| Clay filler | 27.5 |
| Ground limestone | 82.5 |
| Titanium dioxide pigment | 5.5 |
| Polymerized polyvinyl chloride, plastisol grade | 247.5 |

The above components are thoroughly mixed at room temperature to provide a high-viscosity liquid, slightly thixotropic, which may be caused to flow with very little agitation.

The plastisol mixture is fed into an extrusion apparatus having a steam jacketed tuber. During passage through the tuber, the vinyl plastisol mixture is heated by steam at 250 pounds per square inch pressure (404° F.) circulating through the jacket to convert the plastisol to a thermoplastic solid. The vinyl mixture is then extruded around a wire being drawn through the die of the head of the extrusion apparatus.

*Example II.*—The following materials were added to a mixing apparatus in the order listed:

| | Parts by weight |
|---|---|
| Dioctyl phthalate | 150 |
| A paraffinic mineral oil having a boiling range around 400° C. | 5 |
| A mixture of tribasic lead sulphate and tribasic lead silicate | 30 |
| Calcined clay filler | 32.5 |
| Titanium dioxide pigment | 2.5 |
| Polymerized polyvinyl chloride, plastisol grade | 280 |

As in the case of Example I, the mixture was thoroughly stirred to produce a high-viscosity liquid which was then employed as the feed stock to an extrusion apparatus. During passage through the tuber of the apparatus, the vinyl plastisol was heated to fusion temperature (about 400° F.) and then extruded upon a wire being drawn through the die of the extrusion apparatus.

*Example III.*—The following materials were added in the order named to a mixing apparatus:

| | Parts by weight |
|---|---|
| Tricresyl phosphate | 250 |
| Acetylated castor oil | 50 |
| A paraffinic mineral oil having a boiling range around 400° C. | 10 |
| A mixture of tribasic lead sulphate and tribasic lead silicate | 30 |
| Calcined clay filler | 50 |
| Ground limestone | 150 |
| Titanium dioxide pigment | 10 |
| Copolymer of 95 parts by weight vinyl chloride and 5 parts by weight vinyl acetate, plastisol grade | 450 |

As in the case of Examples I and II, mixing was continued until the plastisol had assumed a viscous dough-like consistency. The plastisol thereby produced was then fed to an extrusion apparatus and heated to fusion temperature in the tuber thereof. The fused mixture was then extruded upon wire being drawn through the die of the extrusion head of the apparatus.

*Example IV.*—The following materials were added in the order named to a mixing apparatus:

| | Parts by weight |
|---|---|
| Dioctyl phthalate | 150 |
| A paraffinic petroleum fraction boiling at around 400° C. | 5 |
| A mixture of tribasic lead sulphate and tribasic lead silicate | 30 |
| Calcined clay | 32.5 |
| Titanium dioxide pigment | 2.5 |
| Polymerized polyvinyl chloride, plastisol grade | 230 |
| A polyester reaction product of equal parts by weight of maleic anhydride, diethylene glycol, and styrene | 50 |

Mixing of the above polyester modified plastisol was continued at room temperature to produce a plastisol having a viscous dough-like consistency. As in the case of the previous examples, the plastisol was then fed to an extrusion apparatus and heated to fusion temperature during passage through the tuber thereof. The fused mixture was then extruded upon wire being drawn through the die of the extrusion head of the apparatus.

While the invention has been described with reference to certain specific embodiments thereof, it is obvious that there are many variations which are within the scope of the invention. Therefore, the invention is limited in scope only as may be necessitated by the appended claims.

What I claim as new and desire to secure by Letters Patent of the United States is:

1. The method of preparing insulated wire which comprises mixing a polyvinyl resin with a liquid plasticizer to produce a plastisol, introducing said plastisol to an extrusion apparatus, heating said plastisol to fusion temperature in the barrel of said extrusion apparatus, and extruding the fused plastisol as insulation onto a conductor.

2. The method of claim 1 wherein the polyvinyl resin is polyvinyl chloride.

3. The method of claim 1 wherein the plasticizer is tricresyl phosphate.

References Cited in the file of this patent

UNITED STATES PATENTS

| 2,518,454 | Elliott | Aug. 15, 1950 |
| 2,562,204 | Milton | July 31, 1951 |
| 2,702,408 | Hartland | Feb. 22, 1955 |
| 2,716,623 | Tator | Aug. 30, 1955 |

FOREIGN PATENTS

| 125,966 | Australia | May 17, 1944 |
| 500,298 | Great Britain | Feb. 7, 1939 |